United States Patent

[11] 3,575,209

[72] Inventor Howard B. Kast
 Fairfield, Ohio
[21] Appl. No. 801,290
[22] Filed Feb. 24, 1969
[45] Patented Apr. 20, 1971
[73] Assignee General Electric Company

[54] FLUIDIC POSITION LIMIT CONTROL
 16 Claims, 8 Drawing Figs.
[52] U.S. Cl. ................................................. 137/609,
 137/81.5
[51] Int. Cl. ....................................................F16k 11/14,
 F15c 3/00
[50] Field of Search............................................ 137/81.5,
 86*, 625.12, 625.13, 625.15, 609, 625.47

[56] References Cited
UNITED STATES PATENTS

| | | | |
|---|---|---|---|
| 2,260,979 | 10/1941 | Morin et al. | 137/625.47X |
| 2,822,783 | 2/1958 | Clifton et al. | 137/625.12 |
| 2,840,096 | 6/1958 | DuBois | 137/86 |
| 2,985,183 | 5/1961 | Peatross | 137/86 |
| 3,021,869 | 2/1962 | Ross | 137/625.47X |
| 3,095,906 | 7/1963 | Kolm, Jr. | 137/86X |
| 3,202,885 | 8/1965 | Sohns | 137/625.47X |
| 3,445,934 | 5/1969 | Harris | 137/625.47X |
| 3,461,896 | 8/1969 | Holloway | 137/81.5 |
| 3,465,496 | 9/1969 | Hansen | 137/625.47X |
| 3,468,340 | 9/1969 | DiCamillo | 137/81.5X |

Primary Examiner—Samuel Scott
Attorneys—Derek P. Lawrence, Frank L. Neuhauser, Loren W. Peters, Lee H. Sachs and Oscar B. Waddell ABSTRACT: A position limit control for incorporation into a feedback control system is disclosed which includes an actuator for positioning a control element and wherein it is desirable to provide variable limits on the minimum and maximum position of the actuator. The position limit control comprises function generators for providing fluidic upper limit and lower limit signals, a feedback transducer for providing a fluidic signal proportional to actuator position, means for placing the actuator position signal and the lower limit signal in opposition with each other across the control ports of a first fluid amplifier, means for placing the actuator position signal and the upper limit position signal in opposition with each other across the control ports of the second fluid amplifier, and means for overriding the closed loop control system with the output signals from the said fluid amplifiers. Also disclosed are a unique fluidic function generator for providing a fluidic differential pressure signal and specific override means.

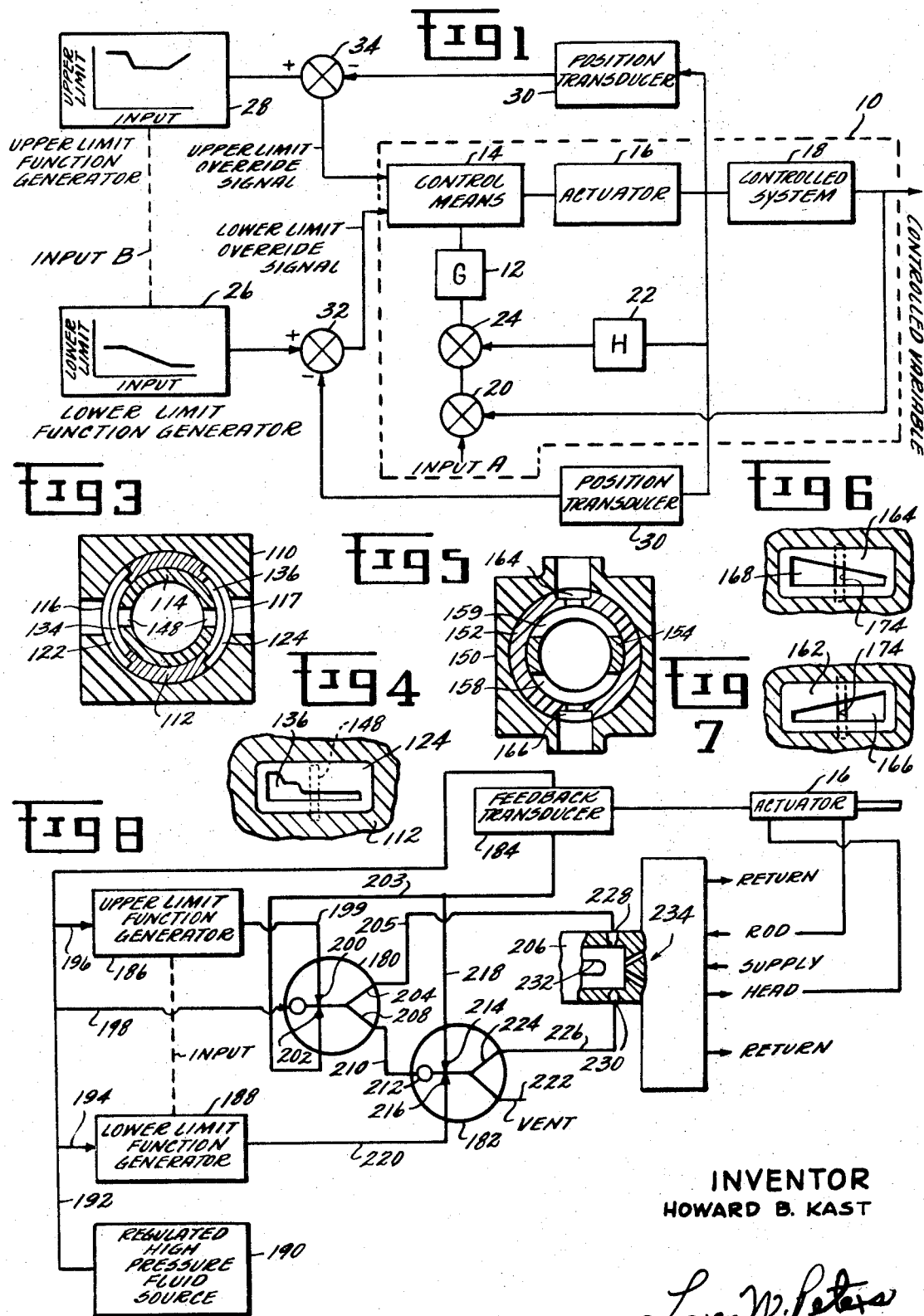

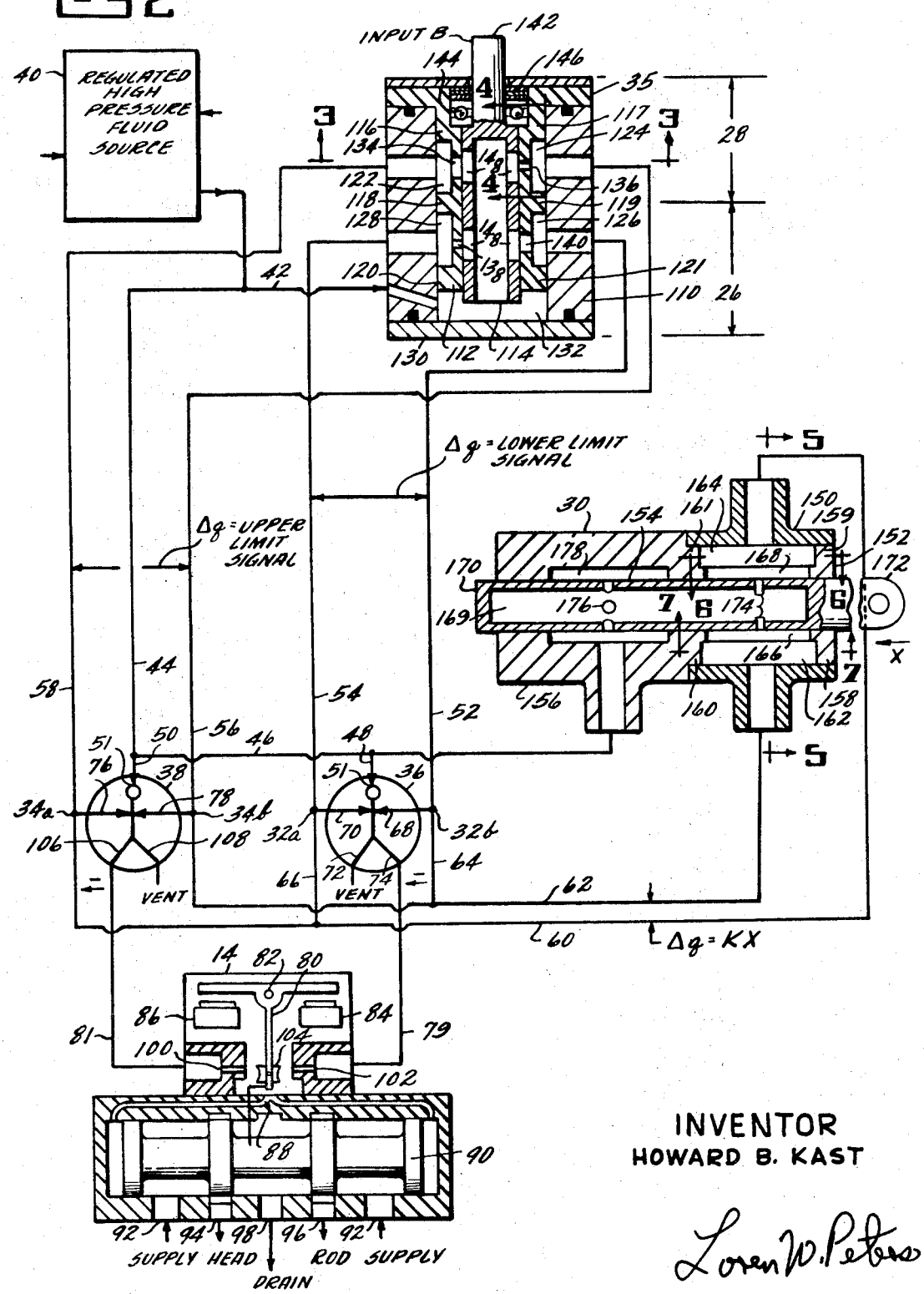

3,575,209

FLUIDIC POSITION LIMIT CONTROL

BACKGROUND OF THE INVENTION

This invention relates to closed loop control systems and more particularly to means for limiting the position of actuators incorporated in such systems.

Many closed loop control systems include an actuator adapted to position a valve or other variable geometry device to effect control of a particular variable. In certain of such applications it becomes desirable, or perhaps necessary, to place variable limits upon the actuator position in the interest of protecting the controlled system while it is operating within a specified portion of its operating range. For example, the control system of an afterburning jet engine may include an exhaust gas temperature control loop in which temperature is maintained by controlling through an actuator the effective opening of a variable area jet exhaust nozzle. In the example described it is incumbent upon the control system to provide limits on the maximum and the minimum exhaust nozzle area, which limits will vary with the operating conditions of the engine, to protect against sizable thrust loss occurring if the temperature control were to drive the exhaust nozzle too far open and to protect against compressor stall if the temperature control were to drive the exhaust nozzle too far closed. The limit function described is presently provided by control hardware which incorporates mechanical devices to generate the upper limit and lower limit signals and further provide mechanical or a combination of hydraulic and mechanical override means. Current position limit controls, while functioning satisfactorily, are however subject to considerable improvement in the interest of weight reduction and increased reliability. In this connection, the art of fluidics has progressed to the point where a group of fluidic components such as fluid amplifiers, resistors and the like are available and offer advantages of light weight and high reliability if they can be combined to perform a desired function.

OBJECTS OF THE INVENTION

It is an object of this invention therefore to provide a fluidic position limit control system which will accomplish the functions noted above.

A further object of this invention is to provide a fluidic function generator which will generate a differential pressure signal in response to a variable input in accordance with the desired limit schedule.

BRIEF SUMMARY OF THE INVENTION

Briefly stated, one aspect of the invention is a position limit control comprising an upper limit function generator, a lower limit function generator, a feedback transducer, a pair of fluid amplifiers, means for impressing the output signals from the lower limit function generator and the feedback transducer in opposition with each other across the control ports of the first fluid amplifier, means for impressing the output of the upper limit function generator and the feedback transducer in opposition to each other across the control ports of the second fluid amplifier, and means for overriding the input to an actuator of a closed loop control system with the output from the said fluid amplifiers. Another aspect of the invention is a fluid function generator comprising a valve structure which includes a pair of porting means having common fluid inlet means and separate fluid discharge means and input means for operating the porting means wherein at least one of the said porting means is variable in area in response to its input according to the function desired to be generated.

DESCRIPTION OF THE DRAWING

While the specification concludes with claims particularly pointing out and distinctly claiming the subject of this invention, it will be more readily understood by reference to the discussion below and the accompanying drawings in which:

FIG. 1 is a diagrammatic view showing a typical closed loop control system and a position limit control incorporated therewith;

FIG. 2 is a diagrammatic view of a preferred embodiment of the position limit control of the invention;

FIG. 3 is a section view taken along the line 3-3 of FIG. 2;

FIG. 4 is a section view taken along the line 4-4 of FIG. 2;

FIG. 5 is a section view taken along the line 5-5 of FIG. 2;

FIG. 6 is a fragmented section view taken along the line 6-6 of FIG. 2;

FIG. 7 is a fragmented section view taken along line 7-7 of FIG. 2; and

FIG. 8 is a diagrammatic view of an alternate embodiment of the invention.

DESCRIPTION OF THE PREFERRED EMBODIMENTS

FIG. 1 is included to illustrate incorporation of a position limit control system with a feedback control system, generally designated by the numeral 10. Control system 10 includes means for providing an input A, a controller 12 which has a transfer function designated by the letter G, control means 14 responsive to controller 12 and adapted to control actuator 16, and a controlled system 18, which may be for example a jet engine and from which is derived a signal representing the controlled variable. System 10 will include feedback means for passing the controlled variable signal to a summing junction 20 for comparison with input A, and may include an additional feedback means for biasing the control loop as a function of actuator position or its time derivative, which feedback means would comprise a feedback transducer 22 (e.g., an actuator slew rate transducer) and a summing junction 24 for including the second feedback in the loop.

A typical position limit control will include a lower limit function generator 26, an upper limit function generator 28, and position transducers 30. In such a system, signals representative of both the lower position limit and upper position limit will be generated by the respective function generators 26, 28 in response to an input B (e.g., in a jet engine control system input B is commonly the pilot throttle setting) and transmitted to summing junctions 32, 34 for comparison with the feedback from position transducers 30. The differences between the upper limit signal and actual actuator position and between the lower limit signal and actual actuator position will then be transmitted to control means 14 and manipulated so that when the actuator position exceeds its upper limit, action of control loop 10 tending to increase actuator position will be overridden, and when actuator position is below its lower limit, action of control loop 10 to decrease actuator position will be similarly overridden.

Referring to FIG. 2, the position limit control of this invention includes active elements comprising a dual function generator 35 (which includes lower position limit function generator 26 and upper position limit function generator 28), position feedback transducer 30, a first fluid amplifier 36, a second fluid amplifier 38, and control means 14. Pressurized fluid is supplied by a regulated high pressure fluid source 40 to function generator 35 by conduit 42, to feedback transducer 30 by conduits 44, 46, and to fluid amplifiers 36, 38 by conduits 48, 50 respectively.

Fluid amplifiers 36, 38 are of standard construction comprising a power nozzle 51, a pair of receivers downstream of power nozzle 51 oppositely disposed with respect to the axis thereof, and a pair of control ports oppositely disposed on a line normal to the axis of power nozzle 51. Amplifiers 36, 38 can be constructed as proportional devices or as Coanda effect devices, their relative merits for use in this circuit being discussed below.

Each of function generators 26, 28 and 30 are adapted to provide differential flow representative of the functional or feedback quantity indicated by the respective elements. The signals are generated by dividing a pressurized fluid supply to the particular function generator into two component flows, one of which is high relative to the other. For example, for a given lower limit demand and actuator 16 position, function generator 26 discharges its relatively low flow component into conduit 52 and its relatively high flow component into conduit 54 while at the same time feedback transducer 30 discharges its relatively high flow component into conduit 62 and its relatively low flow component to conduit 60. The circuit is arranged so that the low flow component in conduit 52 is added to the high flow component in conduit 62 via a branch conduit 64 at summing junction 32b and thence discharged through the control port 68 of fluid amplifier 36 to vent pressure, and the high flow component from conduit 54 is added to the low flow component in conduit 60 via branch conduit 66 at summing junction 32a and is thence discharged through control port 70 in fluid amplifier 36 to the same vent pressure. The pressure acting on control port 68 and 70 is a function of the total fluid flow at summing junctions 32b and 32a respectively, summing point 32b providing a common ground for the fluid in conduits 52 and 64 and summing point 32a forming a common ground for the fluid flow in conduits 54 and 66.

Depending upon the physical position and design of the function generator porting means, the relatively high and low flows may become inverted; however the inversion will take place in both of two opposing function generators at the same time so that circuit operation as described will be unaffected. Inasmuch as the high flow signal from one of the function generators 26, 30 is added to a low flow signal from the other of function generators 26, 30 to provide the input flow of each of the control ports 68, 70, the output signals from function generators 26, 30 are in opposed relation to each other across the control ports of fluid amplifier 36. Any variation in the output of one of function generators 26, 30 will be reflected in its contribution to the fluid flowing through one of control ports 68, 70 in relation to the other thereof and cause a deflection of the power stream in amplifier 36 toward one or the other of receivers 72, 74, thereby providing a change in the output of fluid amplifier 36 which corresponds to the effect of varying the differential pressure across control ports 68, 70.

Function generators 28, 30 are similarly connected to fluid amplifier 38 to function as described for fluid amplifier 36. Function generator 28 provides a similar differential flow signal by dividing the source fluid flow into a relatively high flow which may appear in conduit 58 and a relatively low flow which correspondingly appears in conduit 56. The relatively high flow in conduit 58 is added to the corresponding relatively low flow in conduit 60 provided by feedback transducer or function generator 30 at summing junction 34a and is thence discharged through control port 76 of fluid amplifier 38 to vent, and the relatively low flow in conduit 56 is added to the relatively high flow in conduit 62 provided by feedback transducer 30 at summing junction 34b and is thence discharged through control port 78 of fluid amplifier 38 to vent.

The output signals from fluid amplifiers 36, 38 are directed through conduits 79, 81 respectively to control means 14, which is shown as a two stage jet pipe servo valve comprising a jet pipe 80 for converting pressurized fluid into a high velocity jet stream and pivotally mounted on a torsion spring at a suspension point 82, electromagnetic coils 84, 86 for selectively moving jet pipe 80 in response to an electrical control input, receiver means 88 for converting the high velocity fluid stream into a recovered pressure, and piston 90 which moves in response to actuation of jet pipe 80 and selects a combination of ports 92, 94, 96, 98 to direct pressurized fluid to the actuator 16 incorporated into control system 10 of FIG. 1. Override means are provided in control means 14, which means comprise an opposed pair of override control ports 100, 102 and a reaction surface 104 secured to jet pipe 80. Ports 100, 102 and reaction surface 104 are positionally related so that a fluid stream issuing from either or both of ports 100, 102 will impinge upon reaction surface 104 to apply a force tending to move jet pipe 80 with respect to receiver means 88, the applied force depending upon the relative pressure at the entrance to ports 100, 102. Port 100 is operationally connected to receiver 106 in fluid amplifier 38 by conduit 81 so that a feedback signal from function generator 30 which is greater than the upper limit signal from function generator 28 will result in a fluid stream issuing from control port 100 and tending to move jet pipe 80 so as to oppose an electrical input signal to coils 84, 86 which seeks a large actuator position. Port 102 is connected to receiver 74 in fluid amplifier 36 by conduit 79 to function similarly when the feedback from transducer 30 is less than the signal from function generator 26.

It is desirable that the difference between the pressures at the inlet to ports 100, 102 is minimal when control loop 10 is operating within the range of position limits for actuator 16 so that control loop 10 will be unaffected by the position limit control. This can be accomplished by selecting Coanda effect or wall attachment devices for amplifiers 36, 38. A characteristic of Coanda effect fluid amplifiers is that they operate at either of the extremes wherein fluid in the power stream is directed to one or the other of receivers 72, 74 (or 106, 108) and their output can be switched from one receiver to another by providing a threshold differential pressure signal across the control ports. Thus, considering fluid amplifiers 36, 38 as Coanda effect devices, if the output from feedback transducer 30 exceeds the output from lower limit function generator 26 and is less than the output from function generator 28, the power streams of both amplifiers 36 and 38 will be directed into receivers 72, 108 respectively and neither of override ports 100, 102 will issue a control stream to affect jet pipe 80. If, on the other hand, the output from transducer 30 is less than the output signal from function generator 26, the power stream of amplifier 36 will be directed into receiver 74 and thence through conduit 79 and override control port 102 to apply an overriding force to jet pipe 80. At the same time, the feedback from transducer 30 will also be less than the output of transducer 28 and the power stream in amplifier 38 will be directed into receiver 108 and thence to vent. Similarly, if the output of transducer 30 exceeds the output of function generator 28, the power stream of amplifier 38 will be directed into receiver 106 and thence through conduit 81 and override control port 100 to provide an overriding control force on jet pipe 80 which will tend to decrease the position of actuator 16. At the same time, the output signal from transducer 30 will also exceed the signal from function generator 26 and the power stream of amplifier 36 will be directed through receiver 72 to vent so that override control port 102 will not be operative to oppose the forces generated by control port 100.

Alternative to the above, amplifiers 36, 38 could be provided as proportional devices which have a high gain near null and a relatively low gain in the range beyond that immediately surrounding null. When actuator 16 is operating between its scheduled position limits, both of amplifiers 36, 38 would operate at off null positions in the direction of venting their power streams, and although a small portion of each of the power streams would be directed to override the control ports 100, 102, the effect of the so directed portions on operation of control means 14 would be minimal if the gain characteristic of amplifiers 36, 38 is properly selected. When, however actuator 16 approaches one of its position limits, amplifier 36 or 38, as the case may be, will operate in its high gain region and provide sufficient overriding control force on jet pipe 80 to one of override control ports 100, 102 to accomplish the desired override function. Amplifiers 36, 38 may be staged to provide desired gain so that the output flow or momentum is sufficient to provide jet pipe deflection force.

Referring now to FIGS. 2 and 3, dual function generator 35 comprises a housing 110, a sleeve 112 disposed within housing 110, and a piston 114 closely fitting within sleeve 112. Sleeve 112 includes lands 116, 117, 118, 119, 120, 121, which cooperate with the inner wall of housing 110 to form chambers 122, 124, 126, 128. Outboard sealing lands 116, 117 and center sealing lands 118, 119 cooperate with housing 110 to define a high pressure chamber 122 and low pressure chamber 124 in upper position limit function generator 28. Center sealing lands 118, 119 cooperate with inboard sealing lands 120, 121 and housing 110 to define a low pressure chamber 126 and high pressure chamber 128 in lower position limit function generator 26. Inboard sealing lands 120, 121 cooperate with housing 110 and rear cover 130 to define an inlet chamber 132.

Additionally included in sleeve 112 are ports 134, 136, 138 and 140, the first pair being operatively disposed within function generator 28 and the latter pair being operatively disposed within function generator 26. At least ports 134 and 138, which are connected with high pressure chambers 122 and 128, have a variable height in a plane normal to that of section line 3—3, and ports 136, 140 may have a variable height in the same plane; however the direction of variation would be inverse to that of the first two mentioned ports. The structure of ports 134, 136, 138, 140 and their relationship to piston 114 is more fully explained in connection with FIG. 4 below.

Piston 114 includes an input shaft 142 which is axially positioned and rotatably supported by bearing 144 and mates with seal 146 to preclude leakage to the exterior of the housing from within. Ports 148 are located in the walls of hollow piston 114 and consist of two pairs of diametrically opposed ports positioned to mate with ports 134, 136, 138 and 140 respectively.

FIG. 4 illustrates the relationship of the ports 148 in piston 114 with those in sleeve 112. As is shown in the FIG., port 136 has a variable height, the definition of the variable function being in accordance with the function desired to be generated in the function generator, and port 148 is disposed with its major axis normal to the major axis of port 136. Thus, as piston 114 is rotated, varying portions of port 148 are opened by the variable height of port 136 to increase or decrease, as the case may be, the flow area through the porting means. Assuming a constant pressure inside chamber 132 and a constant discharge pressure at chamber 124, the flows through the porting means shown in FIG. 4 will be a variable function of the rotational position of piston 114.

If in the opposite porting means comprising ports 134, 148, port 134 is constructed with a constant height, the flow therethrough will be constant regardless of the rotational position of piston 114. Thus there will be a differential between the fluid flow into chamber 122 and that into chamber 124, which differential is a function of piston 114 rotational position. If, on the other hand, port 134 is constructed with a variable height whose definition is inverse to that of port 136, the fluid flow into chamber 122 will decrease as a function of piston 114 rotational position at the same rate at which the fluid flow into port 124 increases (or vice versa). Thus, a flow differential will be created which is a function of piston 114 rotational position wherein the gain (p.s.i./deg.) is greater than that in the first case mentioned. In either event, the two different flows issuing through the diametrally opposed porting means will appear as the equivalent of a differential pressure acting across the control ports of the fluid amplifier when connected as described hereinabove. The porting means comprising ports 138, 148 and 140, 148 are similarly constructed.

Referring now to FIGS. 2 and 5, position transducer 30 comprises a housing 150, a sleeve 152 disposed within housing 150, a piston 154, and inlet means 156 integrally formed with sleeve 152. Sleeve 152 includes sealing lands 158, 159, 160, 161 which cooperate with housing 150 to define high pressure chamber 162 and a low pressure chamber 164. Ports 166, 168, which are more definitively described below are included in sleeve 152 and open into chambers 162, 164 respectively.

Piston 154 is a hollow structure having an inlet chamber 169 which is closed on one end by an end cap 170 and on the other end by an extended connection means 172. A pair of rectangular ports 174 is disposed in the wall of chamber 169 so that ports 174 are adjacent ports 166, 168. Inlet ports 176 extend through the wall chamber 169 into an inlet annulus 178 which is formed in inlet means 156.

FIGS. 6 and 7 illustrate the construction and relationship of the porting means comprising ports 174 and 166 on the high pressure side and ports 174 and 168 on the low pressure side. Referring first to FIG. 6, port 168 is a trapezoidal opening with its major axis parallel to the axis of sleeve 152 and a height which linearly varies from a minimum at the end nearest connection means 172 to a maximum at the end farthest removed from connection means 172. Port 174 in piston 154 is disposed with its major axis normal to that of port 168. Thus as piston 154 is translated with respect to sleeve 152, port 168 exposes a linearly varying area of port 174 to chamber 164, and if the pressure in chamber 169 is regulated to a constant value, the flow through porting means comprising port 168, 174 will vary linearly with piston 154 translation.

Referring to FIG. 7, port 166 has a shape which is identical to that of port 168; however port 166 is oriented such that the rate of change of area of port 174 which is exposed by port 166 as piston 154 translates is the negative of the rate of change of area exposed by port 168 with translation of piston 154. Inasmuch as the inlet to both of ports 174 is at the same pressure, and assuming chambers 162 and 164 are at equal pressure, the difference between the fluid flow into chambers 162 and 164 will be a linear function of piston 154 translational position. If chambers 162, 164 are connected across the control ports of a fluid amplifier as hereinabove described, the effect of the differential flow on operation of the fluid amplifier will be equivalent to the effect of a proportional differential pressure thereacross.

FIG. 8 illustrates an alternate embodiment of this invention. The FIG. 8 system comprises a pair of fluid amplifiers 180, 182, a variable feedback restrictor 184, an upper position limit function generator 186, and a lower position limit function generator 188. A regulated pressure source 190 supplies constant pressure fluid to elements 180, 184, 186 and 188 via conduits 192, 194, 196, and 198.

Upper limit function generator 186 is adapted to create a pressure drop as a function of mechanical input according to the function desired to be generated; hence the output thereof is a pressure which is proportional to the desired value of the particular upper limit. This output is transmitted through conduit 199 to control port 200 on fluid amplifier 180. At the same time a similarly generated pressure signal is transmitted from variable restrictor 184 to control port 202 of fluid amplifier 180 through conduit 203. Thus, if the feedback signal so provided exceeds the upper position limit provided by element 186, the power stream of fluid amplifier 180 will be directed into a receiver 204 thereof and thence through conduit 205 to the override means provided in servo valve 206 (which can have a construction identical to that of control means 14 described in connection with FIG. 2) which is the active means for controlling actuation of the actuator on which the position limit must be placed. If, on the other hand, the signal in conduit 199 exceeds that in conduit 203, the power stream of fluid amplifier 180 will be directed into receiver 208 and thence through conduit 210 to power nozzle 212 of fluid amplifier 182.

The power stream generated by nozzle 212 is subject to deflection by control streams issuing from control ports 214, 216, the first of which depends upon the feedback signal transmitted through conduit 218 from variable feedback restrictor 184 and the second of which depends upon the lower position limit signal transmitted through conduit 220 from function generator 188. Thus, if the feedback signal at control port 214 exceeds the lower position limit signal at control port 216, the power stream of fluid amplifier 182 will be vented through receiver 222 to a relatively low pressure. If, on the other hand, the signal at port 216 exceeds that at 214, the power stream of fluid amplifier 182 will be directed into receiver 224 and thence through conduit 226 to the override means incorporated in servo valve 206.

Position limit function generators 186, 188 can be provided by constructing a device similar to dual function generator 35 in FIG. 2; however device 35 would have to be modified to provide a single sided output only. This can be accomplished, for example, by dead heading chambers 122, 128, or alternatively, by constructing the porting means described in connection with FIGS. 2 and 3 so that diametrally opposed ports are variable in area in the same direction and discharging the fluid flow from diametrally opposed chambers (e.g., 122, 124) into a common header which is connected with the output conduit of the device. Variable restrictor 184 can be provided by similarly modifying the structure shown in FIG. 2 for feedback transducer 30. As mentioned above servo valve 206 and the override means incorporated therein can be constructed identically with control means 14 shown in FIG. 2, or can comprise override ports 228, 230 oppositely disposed on a line passing between jet pipe 232 and receiver 234 to provide for momentum interaction between the stream issuing from jet pipe 232 and the control streams issuing from ports 228, 230. The comments included herein in connection with FIG. 2 respecting the relative merits of Coanda effect or proportional amplifiers for this application apply equally to the fluid amplifiers 180, 182.

In addition to the hereinbefore stated weight reduction and reliability advantages over mechanical and hydromechanical prior art position limit controls, the invention described contains several features not included in prior art systems using fluid signals for computation and control. For example, the systems described herein can be readily adapted for use with oil as a working fluid so that there is no oil-air interface between the computational and actuator elements, and all moving parts will be oil lubricated and cooled. Additionally, balanced bridge circuits are used in the control to minimize viscosity and regulated pressure effects. Further, it is significant that the system described herein uses a continually flowing fluid in all its branches (i.e. none of the signals are blocked) so that signal noise will not substantially effect operation of the system.

I claim:
1. A fluidic function generator which comprises:
   a valve structure comprising an enclosed housing, a sleeve disposed in said housing, and a piston disposed in said sleeve and movable with one degree of freedom relative to said sleeve, said piston comprising a hollow cylindrical member having at least one closed end;
   input means for moving said piston comprising a shaft extending from said closed end through said housing and sealingly engaged with said housing for movement relative thereto;
   a pair of porting means in said valve, each porting means comprising a first port extending through the wall of said piston and a second port extending through the wall of said sleeve, said first and said second ports being located and oriented with respect to each other so that movement of said piston will result in movement of said first and second ports with respect to each other to provide a flow area across a said porting means which is defined by two opposed edges of said first port and two opposed edges of said second port; and
   fluid inlet means for supplying inlet fluid to the interior of said piston.

2. The function generator recited in claim 1 wherein at least one of said first and second ports included in at least one of said porting means has a varying height which is variably exposed by movement of said piston.

3. The function generator recited in claim 2 wherein said second port has a varying height exposed by movement of said piston and said first port has a constant height along a line normal to the motion of said piston.

4. The function generator recited in claim 3 wherein said piston is adapted for rotation only.

5. The function generator recited in claim 3 wherein said piston is adapted for translational movement only.

6. The function generator recited in claim 3 wherein each said porting means includes a variable height second port, the said second ports being oriented with respect to each other so that the rate of change of area of said first porting means is the negative of the rate of change of the second porting means.

7. In a position control system including an actuator for positioning a controlled element and control means therefor, a fluidic position limit control comprising:
   a. a pair of fluid amplification means each having a power nozzle connected to a source of pressurized fluid and adapted to convert said pressurized fluid to a controllable fluid stream, output means, and a pair of opposed control ports disposed on opposite sides of the axis of said power nozzle;
   b. a first function generator adapted to generate a fluidic signal proportional to a lower position limit;
   c. a second function generator adapted to generate a fluidic signal proportional to an upper position limit;
   d. a third function generator adapted to generate a fluidic signal proportional to the position of said actuator;
   e. lower limit conduit means connecting said first function generator to the first of said fluid amplifiers and adapted to impress the lower position limit signal upon at least one of the control ports of said first fluid amplification means to promote a corresponding signal from its said output means;
   f. upper limit conduit means connecting said second function generator to the second of said fluid amplification means and adapted to impress the upper position limit signal upon at least one of the control ports of said second fluid amplifier to promote a corresponding signal from its said output means;
   g. feedback conduit means connecting said third function generator to each said fluid amplification means and adapted to impress the actuator position signal upon at least one control port in each fluid amplification means to oppose the effect of the said lower and upper position limit signals on the first and second fluid amplification means respectively, whereby a first output signal from the output means of said first fluid amplification means will result which indicates deviation of the actuator position from its lower limit and a second output signal from the output means of said second fluid amplification means will result which indicates deviation of the actuator position from its upper limit;
   h. override means included in said control means for overriding the effect thereof on said actuator in response to a fluidic signal; and
   i. means for routing said first and second output signals to said override means so that said first output signal will oppose tendency of the said control means to decrease the position of said actuator and said second output signal will oppose tendency of the said control means to increase the position of said actuator.

8. The position limit control recited in claim 7 wherein:
said function generators are adapted to generate pressure levels representative of their respective variables;
said lower limit conduit means is connected to a first control port in said first fluid amplification means;
said upper limit conduit means is connected to a first control port in said second fluid amplification means; and
said feedback conduit means is connected to the other of said control ports in each of said first and second fluid amplification means.

9. The position limit control recited in claim 8 wherein;
a. said first and second function generators each comprise a variable restrictor, said variable restrictor including variable area porting means, mechanical input means thereto, fluid inlet means, and fluid discharge means, said variable area porting means having a flow area variation with input which is representative of the respective minimum and maximum position schedules;

b. said third function generator comprises a variable restrictor which includes variable area porting means, mechanical input means thereto, fluid inlet means, and fluid discharge means, said porting means having a linear flow area variation with input; and
c. the fluid inlet means of said function generators are connected to a common source of pressurized fluid, whereby the discharge pressures of said function generators are representative of the respective functions generated in equal proportions to each other.

10. The position limit control recited in claim 7 wherein:
said function generators are each adapted to generate two flow signals, the difference between which is representative of the respective variable represented;
said lower limit conduit means comprises a first conduit connecting the first of said two lower limit flow signals to a first control port in said first fluid amplification means and a second conduit connecting the second of said lower limit flow signals to the second control port in said first fluid amplification means;
said upper limit conduit means comprises a third conduit connecting the first of said upper limit flow signals to a first control port in said second fluid amplification means and a fourth conduit connecting the second of said upper limit flow signals to the second control port in said second fluid amplification means;
said feedback conduit means comprises a fifth conduit connecting the first of said two feedback flow signals to the second control port in each of said fluid amplification means and a sixth conduit connecting the second of said feedback flow signals to the first control port in each of said fluid amplification means; and
said conduit means being connected so as to add the higher of said feedback flow signals to the lower of said lower limit and upper limit flow signals and the lower of said feedback flow signals to the higher of said lower limit and upper limit flow signals.

11. The position limit control recited in claim 10 wherein;
said output means comprises a pair of receivers symmetrically disposed with respect to the axis of said power nozzle, the proportion of said fluid stream being directed into the first of said receivers being greater than that directed into the second of said receivers when the pressure at said first control port exceeds that at said second control port and vice versa;
said first receiver in said first fluid amplifier is connected to provide the said first output signal;
said second receiver in said second fluid amplifier is connected to provide the said second output signal; and
the remaining said receivers are connected to a common ground pressure sink.

12. The position limit control in claim 11 wherein;
said function generators each comprise a valve structure which includes a pair of porting means, fluid inlet means common to both said porting means, separate fluid discharge means for each said porting means, and input means for operating said porting means, at least one of said porting means being variable in area in response to operation of the said input means according to the function desired to be generated, the change in area of the first of said variable area porting means being oppositely directed to the change in area of the other of said variable area porting means.

13. The position limit control recited in claim 12 wherein said control includes a common source of pressurized fluid connected to the fluid inlet means of each of said function generators.

14. The position limit control recited in claim 13 wherein;
said control means comprises a jet pipe servo valve which includes a jet pipe for converting pressurized fluid into a high velocity fluid jet stream, receiving means for converting the kinetic energy of said jet stream to pressure energy, and means for changing the relative proportion of the said jet stream received by said receiving means; and
said override means comprises a pair of override ports oppositely disposed with respect to the axis of said jet pipe and adapted to issue control streams in response to said output signals which control streams will affect the relative proportion of said jet stream received by said receiving means.

15. The position limit control recited in claim 14 wherein said override ports are located on a line passing between said jet pipe and said receiving means and are adapted to issue control streams which will affect the proportion of said jet stream received by said receiving means by momentum interaction between said control streams and said jet stream.

16. The position limit control recited in claim 15 wherein:
said jet pipe is movable with respect to said receiving means and includes a reaction surface disposed on each side thereof; and
said override ports are located on a line passing through said reaction surfaces perpendicularly to said jet pipe, whereby the interaction of control streams issuing from said override ports with said reaction surfaces will create forces tending to move said jet pipe with respect to said receiving means.